United States Patent
Higgins

(10) Patent No.: US 11,454,256 B1
(45) Date of Patent: Sep. 27, 2022

(54) INTERLOCKED SINGLE FUNCTION ACTIVATION VALVE

(71) Applicant: Striped Monkey IP, Gastonia, NC (US)

(72) Inventor: Daniel James Higgins, Gastonia, NC (US)

(73) Assignee: STRIPED MONKEY IP, Raleigh, NC (US)

(*) Notice: Subject to any disclaimer, the term of this patent is extended or adjusted under 35 U.S.C. 154(b) by 0 days.

(21) Appl. No.: 17/201,390

(22) Filed: Mar. 15, 2021

(51) Int. Cl.
F15B 13/04 (2006.01)
F16K 11/07 (2006.01)

(52) U.S. Cl.
CPC ...... *F15B 13/0402* (2013.01); *F16K 11/0704* (2013.01); *F15B 13/0403* (2013.01); *Y10T 137/7734* (2015.04)

(58) Field of Classification Search
CPC . F15B 13/0403; Y10T 137/7734; F16K 35/00
See application file for complete search history.

(56) References Cited

U.S. PATENT DOCUMENTS

| | | | | |
|---|---|---|---|---|
| 4,083,382 | A * | 4/1978 | Khatti | F16D 67/04 74/473.11 |
| 4,306,586 | A * | 12/1981 | Spencer | E21B 34/16 137/627.5 |
| 5,664,417 | A * | 9/1997 | Wilke | F15B 13/0403 137/625.68 |
| 8,083,205 | B2 | 12/2011 | Sneh | |
| 10,961,864 | B2 * | 3/2021 | Miranda | F01D 17/141 |
| 11,255,448 | B2 * | 2/2022 | Komatsuzaki | F16K 7/17 |
| 11,350,506 | B1 * | 5/2022 | De Oliveira Fanti | H05B 47/105 |
| 11,352,239 | B1 * | 6/2022 | Spitsbergen | B66C 23/166 |
| 11,352,505 | B1 * | 6/2022 | Kamavaram | C09C 1/3072 |
| 11,353,136 | B2 * | 6/2022 | Sands, III | F16K 31/10 |

\* cited by examiner

*Primary Examiner* — Robert K Arundale
(74) *Attorney, Agent, or Firm* — NK Patent Law

(57) ABSTRACT

An interlocked single function activation valve for hydraulic systems is disclosed. The hydraulic valve prevents unsafe tie-down or safety override situations by requiring the safety mechanism to be reset each time the hydraulic system is used. The hydraulic valve includes an interlock spool that moves to an extension position when the hydraulic system is de-pressurized and then re-pressurized while the control lever is engaged (i.e., tied down). When the interlock spool is in the extension position, it prevents the system from reaching a working pressure, thereby forcing a reset of the control lever before the system can reach working pressure.

10 Claims, 12 Drawing Sheets

START-UP

START-UP

START-UP

NORMAL OPERATION

NORMAL OPERATION

SAFETY OVERRIDE

START-UP

NORMAL OPERATION

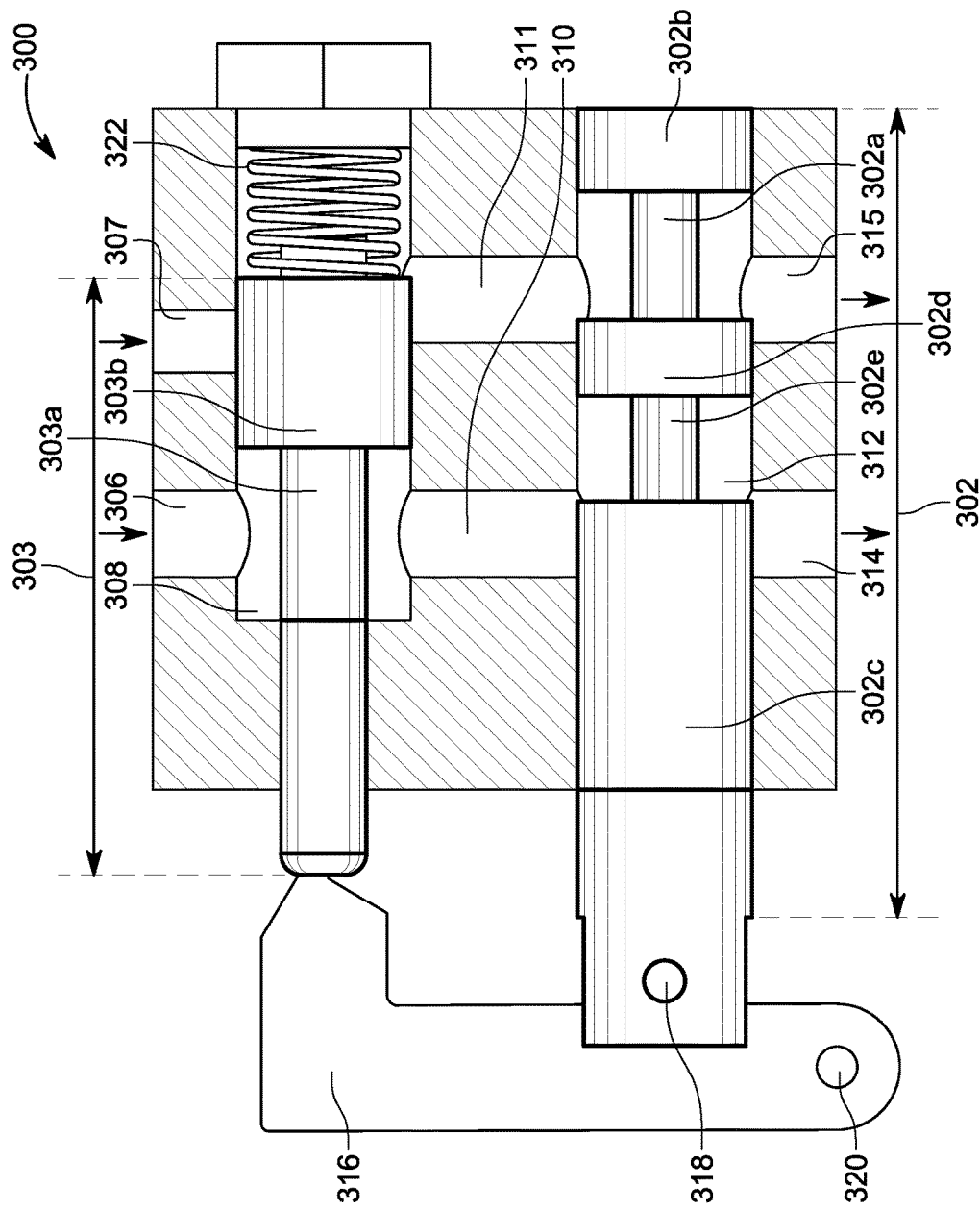

NORMAL OPERATION

INTERLOCKED SINGLE FUNCTION ACTIVATION VALVE

TECHNICAL FIELD

The present invention relates to hydraulic systems, and specifically to an interlocked single function activation valve that prevents unsafe tie-down situations where a user attempts to bypass the use of a safety lanyard or other safety device.

BACKGROUND

In some applications, a hydraulic system may require the use of a safety lanyard or other type of safety device to turn on the hydraulic system. For example, in a bucket truck, the hydraulic system that operates the bucket truck may be designed such that system will not turn on unless the operator has clipped their safety lanyard into place. The safety lanyard may be part of a fall-arresting system, for example. Some operators may find having to clip their safety lanyard into the system each time they use it to be inconvenient, so they may attempt to override the safety system by tying down the clip such that the system appears to always have a safety lanyard or other safety device clipped in. This can lead to some very dangerous situations.

It would be beneficial to have a device that is part of the system that prevents such an unsafe tie-down or safety override system.

SUMMARY

Accordingly, described herein is an interlocked single function activation valve for hydraulic systems that prevents unsafe tie-down or safety override situations by requiring the safety mechanism to be reset each time the hydraulic system is used.

This summary is provided to introduce in a simplified form concepts that are further described in the following detailed descriptions. This summary is not intended to identify key features or essential features of the claimed subject matter, nor is it to be construed as limiting the scope of the claimed subject matter.

The present disclosure describes implementations that relate to a hydraulic valve assembly. According to various embodiments of the presently disclosed subject matter, a hydraulic valve assembly for preventing safety override in a hydraulic system is disclosed. The hydraulic valve assembly is configured to prevent the flow of hydraulic fluid at a working pressure when the hydraulic system is de-pressurized and then re-pressurized while an operation lever is engaged.

According to another embodiment, a hydraulic valve assembly for preventing safety override is disclosed. The hydraulic valve assembly includes a valve body having a first cylindrical internal cavity and a second cylindrical internal cavity, the cylindrical internal cavities arranged in a stacked configuration. The hydraulic valve assembly further includes a first axially moveable cylindrical spool supported within the first cylindrical cavity. The first spool is attached at one end to a valve control member such that when the valve control member is engaged, the first spool is in an operational position. The hydraulic valve assembly further includes a second axially moveable cylindrical spool supported within the second cylindrical cavity. The second spool contacts the valve control member when the valve control member is not engaged and does not contact the valve control member when the valve control member is engaged. The second spool is an interlock spool having a radially oriented interlock land provided thereon. The interlock land is coaxial with the interlock spool. The interlock land engages a biasing member providing force in the axial direction toward the control member. The hydraulic valve assembly further includes hydraulic ports defined through the valve body for flow therethrough of hydraulic fluid, each hydraulic port in fluid communication with the first cavity and the second cavity. The hydraulic ports include an inlet port that allows the hydraulic fluid to flow into the hydraulic valve assembly and an outlet port that allows the hydraulic fluid to flow out of the hydraulic valve assembly. The interlock spool is axially movable between a retention position and an extension position such that when the interlock spool is in the extension position, the interlock land prevents flow of the hydraulic fluid out of the outlet port at a working pressure.

According to another embodiment, a hydraulic valve assembly for preventing safety override is disclosed. The hydraulic valve assembly includes a valve body having a first cylindrical internal cavity and a second cylindrical internal cavity, the cylindrical internal cavities arranged in an in-line configuration along a radial axis. The hydraulic valve body further includes a first axially moveable cylindrical spool supported within the first cylindrical cavity. The first spool is attached at one end to a valve control member. The hydraulic valve body further includes a second axially moveable cylindrical spool supported within the second cylindrical cavity. The second spool contacts the first spool at one end. The second spool is an interlock spool having a radially oriented interlock land provided thereon that is coaxial with the interlock spool. The interlock land engages a biasing member providing force in the axial direction toward the control member. The hydraulic valve further includes hydraulic ports defined through the valve body for flow therethrough of hydraulic fluid. The hydraulic ports include an inlet port that allows the hydraulic fluid to flow into the hydraulic valve assembly and an outlet port that allows the hydraulic fluid to flow out of the hydraulic valve assembly. The hydraulic ports further include a system pressure inlet port and a tank outlet port. When the control member is engaged, the interlock land allows flow of the hydraulic fluid from the system pressure port to the tank port, and the flow of the hydraulic fluid from the system pressure port to the tank port prevents the hydraulic system from achieving a working pressure. The interlock spool is axially movable between a retention position and an extension position such that when the interlock spool is in the extension position, the interlock land prevents flow of the hydraulic fluid out of the outlet port at a working pressure.

According to at least one embodiment, the hydraulic ports hydraulic ports further include a system pressure inlet port and a tank outlet port, and wherein, when the control member is engaged, the interlock land allows flow of the hydraulic fluid from the system pressure port to the tank port, and the flow of the hydraulic fluid from the system pressure port to the tank port prevents the hydraulic system from achieving a working pressure.

According to at least one embodiment, the interlock spool moves into the extension position in response to the force provided by the biasing member when the hydraulic system is de-pressurized while the control member is engaged.

According to at least one embodiment, when the hydraulic system is re-pressurized after being de-pressurized, a dump-to-tank path allows the hydraulic fluid to flow to the tank.

According to at least one embodiment, the hydraulic system is pressurized by a fluid pump that is in fluid communication with the hydraulic valve assembly.

According to at least one embodiment, the hydraulic system is pressurized in response a user powering on the hydraulic system.

According to at least one embodiment, safety override occurs when a user of the hydraulic valve assembly configures the control member to remain in an engaged position when the hydraulic system is turned off.

According to at least one embodiment, the control member is engaged by engaging a safety device with the control member, wherein the safety device is part of a fall-arrest system.

According to at least one embodiment, the control member is engaged by pulling it away from the hydraulic valve assembly.

According to at least one embodiment, the interlock spool is in the extension position when the force exerted on the interlock land by the biasing member is greater than a force exerted in the opposite direction by pressure of the hydraulic fluid.

According to at least one embodiment, the tie-down configuration is a safety override configuration intended to allow a user of the control member to operate the hydraulic valve assembly without using a safety mechanism.

BRIEF DESCRIPTION OF THE DRAWINGS

In order to describe the technical solutions of the examples of the present invention more clearly, the figures required to be used for the examples will be briefly introduced below. It should be understood that the following figures only show some examples of the present invention, and thus shall not be construed as limiting the scope thereof; and for a person skilled in the art, further relevant figures could also be obtained according to the figures without using inventive efforts.

FIG. 3A illustrates a perspective view of a dump-to-tank embodiment of the interlocked single-function activation valve described herein in the start-up position.

DETAILED DESCRIPTION OF THE EMBODIMENTS

Figure 1A:
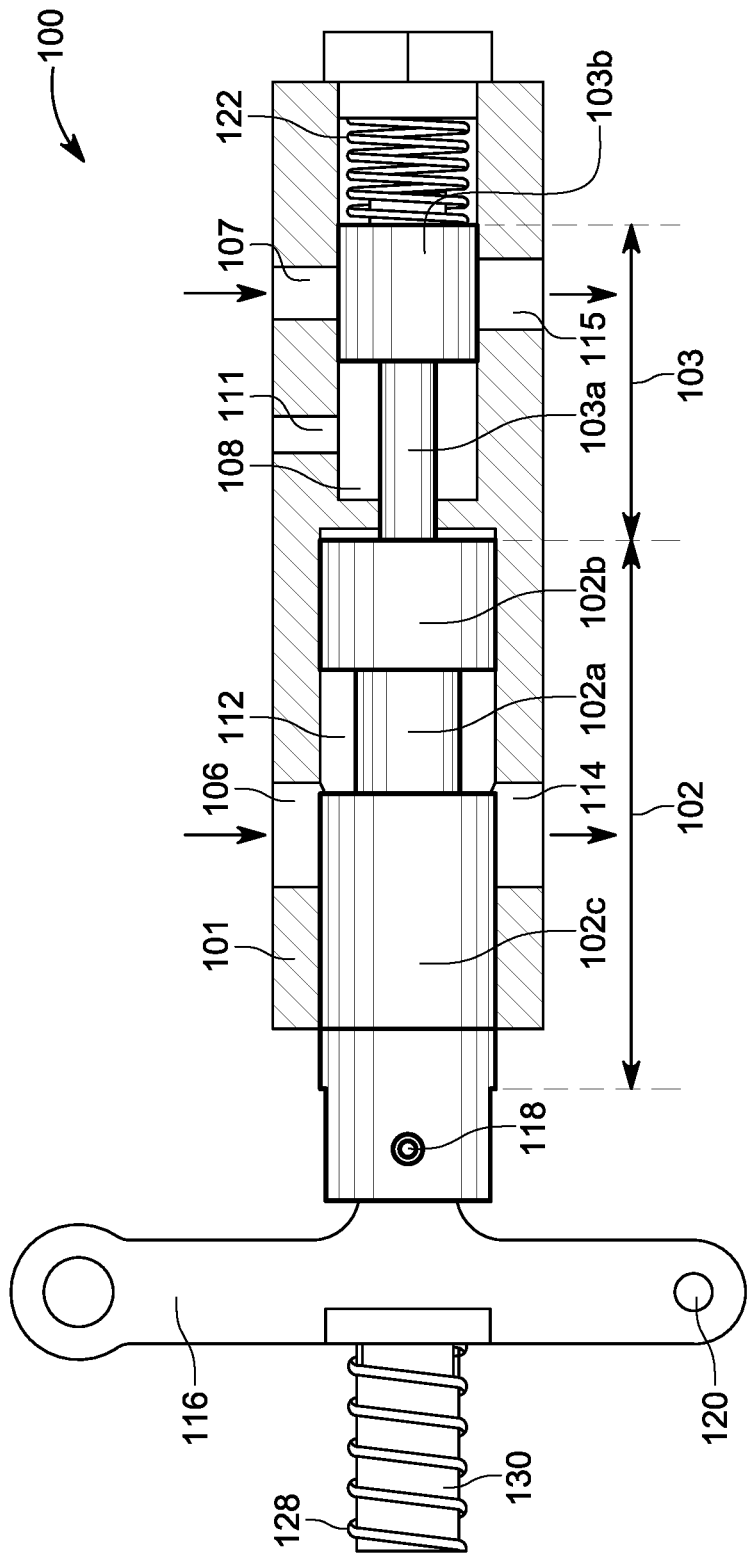
FIG. 1A illustrates a perspective view of an in-line embodiment of the interlocked single-function activation valve described herein in the start-up position.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Embodiments of the presently disclosed subject matter provide for an interlocked single function activation valve that advantageously prevents users from overriding the safety features by tying down the system.

There are numerous reasons a hydraulic system might require the user to use a safety device, such as, for example, a safety lanyard, safety key, or other type of safety device before operating the system. Such a safety device may be used to ensure the user is physically present at the controls, or has engaged their fall-arrest system (e.g., by clipping it to a structure connected to the hydraulic system), etc. In some cases, the required use of such safety devices may be overridden by tying them down such that it always appears that the user has, for example, engaged their safety device, even when they have not. When the required use of a safety device is overridden by tying it down, the system may not have a way to differentiate whether the user is actually involved (i.e., the user has properly engaged their safety device) or whether it has been tied down (i.e., the user has attempted to override the safety system).

To solve this problem, an interlocked single function activation valve is disclosed. The interlocked single function activation valve prevents safety override in a hydraulic system. The interlocked single function activation valve comprises a hydraulic valve assembly. The hydraulic valve assembly is configured to prevent the flow of hydraulic fluid at a working pressure when the hydraulic system is de-pressurized and then re-pressurized while an operation lever is engaged, for example, via a tie-down or safety override. This may be accomplished using a number of different configurations, and the disclosure herein is not limited to the specific embodiments described.

It will be understood that the interlocked single function activation valve described herein may be used in any type of hydraulic system, including but not limited to systems with one or more auxiliary pumps and/or tanks.

The interlocked single function activation valve described herein is shown in different embodiments, including a stacked embodiment and an in-line embodiment, which may be configured with or without a dump-to-tank option, depending on the specific use case of the valve.

Referring now to FIGS. 1A-1F, an interlocked single-function activation valve 100 (alternately referred to as "assembly 100" or simply "assembly") is provided herein, according to one or more embodiments of the presently disclosed subject matter. Assembly 100 includes a valve body 101. Valve body 101 includes an internal operational cavity 112 and an internal safety cavity 108. In the embodiment shown in FIGS. 1A-1F, the operational cavity 112 and the safety cavity 108 are axially aligned. In a preferred embodiment, operational cavity 112 and safety cavity 108 are cylindrical.

Assembly 100 includes working inlet port 106 and working outlet port 114 defined through valve body 101 for flow therethrough of hydraulic fluid. Each of inlet port 106 and outlet port 114 is in fluid communication with operational cavity 112. Assembly 100 further includes a pilot port 111, a system pressure port 107, and a tank port 115 defined through valve body 101 for flow therethrough of hydraulic fluid. Each of the pilot port 111, system pressure port 107, and tank port 115 is in fluid communication with safety cavity 108. The hydraulic fluid generally flows, for example, as indicated by the flow arrows on FIGS. 1A-1F.

Assembly 100 includes operational spool 102 and interlock spool 103. Operational spool 102 comprises operational spool groove 102a, inner operational land 102b, and outer operational land 102c. Operational spool 102 is an axially moveable cylindrical spool that is supported within operational cavity 112. Interlock spool 103 comprises interlock shaft 103a and interlock land 103b. Interlock spool 103 is an axially moveable cylindrical spool that is supported within safety cavity 108. Interlock land 103b of interlock spool 103 engages biasing member 122. In a preferred embodiment, as shown in FIG. 1A, biasing member 122 is a spring. Interlock spool 103 is axially aligned with operational spool 102, and interlock spool 103 engages an approximately equally sized aperture bored within operational spool 102. Interlock spool 103 is axially moveable relative to the operational spool 102.

Assembly 100 includes an operation lever 116. Operational spool 102 is mechanically coupled to operation lever 116 via spool pivot pin 118. Pivot 120 allows for rotational engagement of operation lever 116. Pivot 120 is fixed relative to the valve body, which allows for the operation lever 116 to move relative to the valve body. Valve control spring 128 on valve control support post 130 provides a mechanical force that the user must override to engage operation lever 116. In some embodiments, the insertion or engagement of the safety device acts against this mechanical force to hold the operation lever 116 in the engaged position.

FIG. 1A illustrates a perspective view of an in-line embodiment of the interlocked single-function activation valve described herein in the start-up position. FIG. 1A shows the assembly 100 in the start-up position. When in the startup position, the operator's safety key has not yet been inserted, and the system is not yet pressurized. When in the start-up position, interlock spool 103 with interlock land 103b is held in the retracted position by operation lever 116, as shown in FIG. 1A. Upon startup, when the system is pressurized, working inlet port 106, system pressure port 107, and pilot port 111 will all see the same system pressure, as they are all tied together to the same inlet pressure. When the system is pressurized, hydraulic fluid flows into pilot port 111 and fills internal safety cavity 108. The pressure of the hydraulic fluid in safety cavity 108 provides force against interlock land 103b and holds the interlock spool 103 in the retracted position. When interlock spool 103 is in the retracted position, biasing member 122 is compressed and applies an opposite force toward operation lever 116.

During startup of the hydraulic system, hydraulic fluid flows into the assembly 100 via working inlet port 106. The hydraulic fluid may be supplied by a hydraulic fluid pump (not shown in FIG. 1A). The hydraulic fluid is pressurized. As a result, the pressure in working inlet port 106 is at the system pressure upon startup. Because the operational spool 102 is not engaged, the flow of hydraulic fluid is blocked from entering the operational cavity 112 by the operational spool 102. Accordingly, working outlet port 114 is not pressurized when the assembly 100 is in the start-up position. However, because the hydraulic fluid is pressurized in safety cavity 108, the interlock spool 103 is held in the retracted position by the pressure of the hydraulic fluid pushing against interlock land 103b. The force of the hydraulic fluid is greater than the force of biasing member 122, thereby overcoming said force.

Figure 1B:
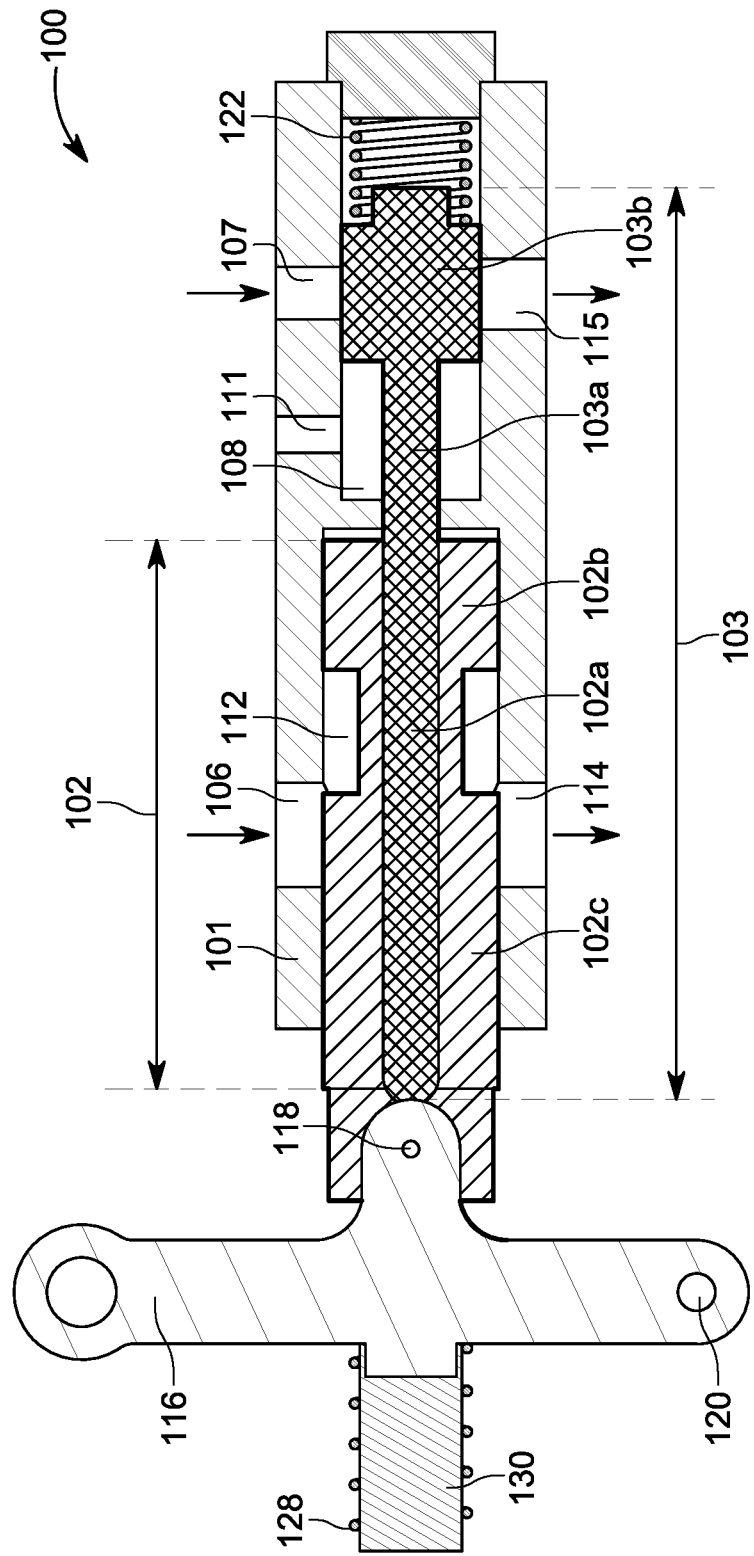
FIG. 1B illustrates a cross-sectional view of the in-line embodiment of the interlocked single-function activation valve described herein in the start-up position.

FIG. 1B illustrates a cross-sectional view of the in-line embodiment of the interlocked single-function activation valve described herein in the start-up position.

Referring to FIG. 1B, operation lever 116 mechanically pushes the interlock spool 103 into the retracted position via interlock shaft 103a. FIG. 1B illustrates an exemplary embodiment of the engagement between the operational spool 102 and interlock spool 103, where the engagement occurs at the operation level 116. Other variations of this engagement are contemplated by this disclosure as well. For example, the engagement may not be at the operation lever 116 but rather in the operational spool 102 more toward the middle of the valve.

Figure 1C:
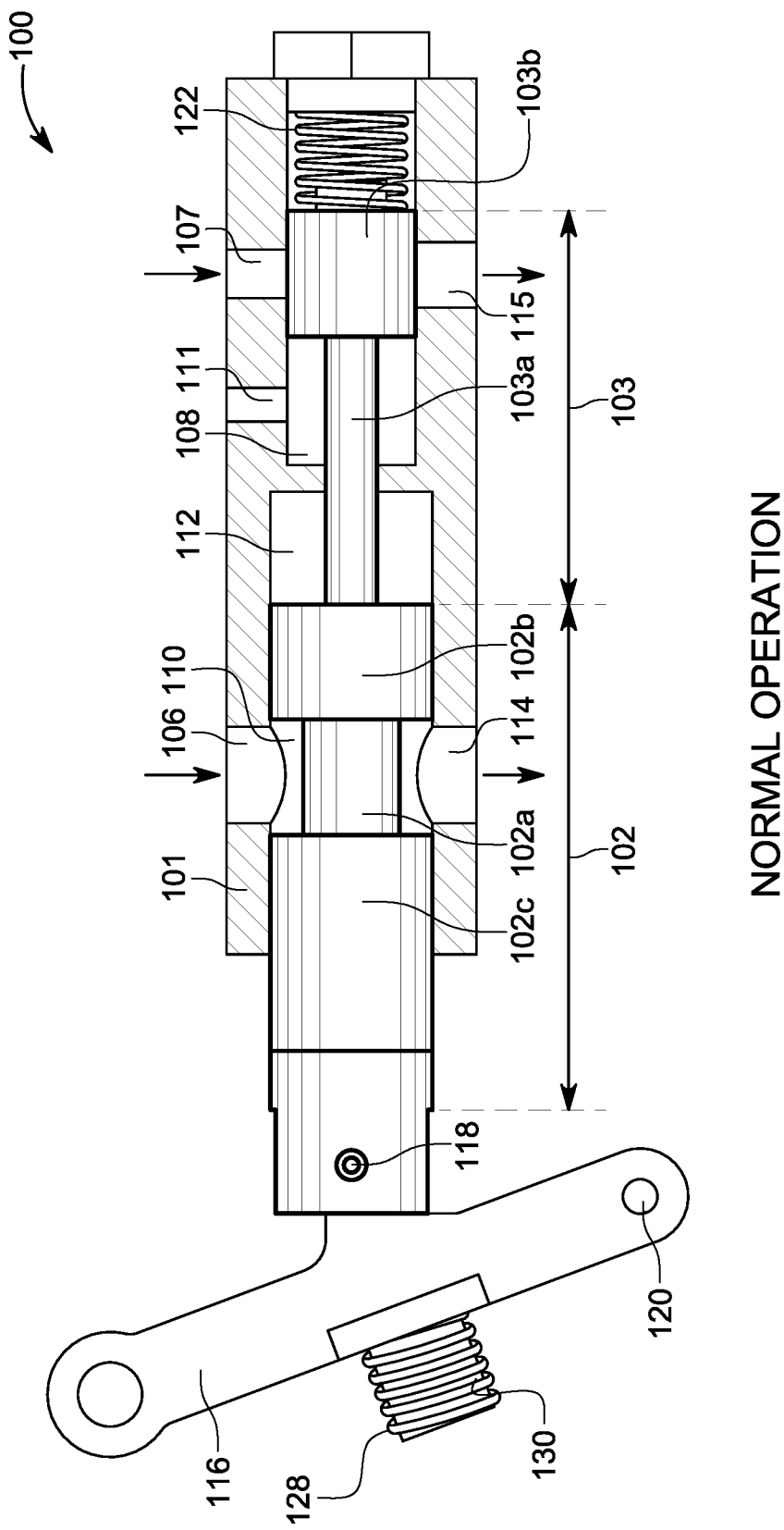
FIG. 1C illustrates a perspective view of the in-line embodiment of the interlocked single-function activation valve described herein during normal operation.

FIG. 1C illustrates a perspective view of the in-line embodiment of the interlocked single-function activation valve described herein during normal operation.

As shown in FIG. 1C, during normal operation, operation lever 116 is engaged by the user. As explained, the operation lever 116 may be part of a safety system for the hydraulic system, whereby the operation lever 116 must be engaged by the user of the hydraulic system before the hydraulic system can be used. Thus, during normal operation, a user must engage operation lever 116, for example, by clipping in a safety lanyard or by inserting a key card outside the assembly 100 such that operation lever 116 is moved axially away from the assembly 100. In the context of a bucket truck, the safety device may be lanyard that is part of a fall-arrest system. The safety device (e.g., the clip of a fall-arrest system) must be engaged so that the hydraulic system will not operate until the user appears to have clipped their safety harness into place.

In the embodiment shown in FIGS. 1A-1F, when the operation lever 116 is engaged, it pivots away from assembly 100 around pivot 120, which is fixed relative to the assembly 100. As a result, operational spool 102 moves axially outward relative to interlock spool 103, and away from interlock spool 103. Because safety cavity 108 is pressurized at the system pressure with the hydraulic fluid, interlock spool 103 remains in the retracted position, even when operation lever 116 is engaged.

When operation lever 116 is engaged, spool pivot pin 118 causes operational spool 102 to move axially such that the operational spool groove 102a of operational spool 102 allows the hydraulic fluid to flow into operational cavity 112 through internal passage 110 and out working outlet port 114. The hydraulic fluid flowing out of working outlet port 114 is used to operate the system to which the assembly 100 is connected.

Figure 1D:
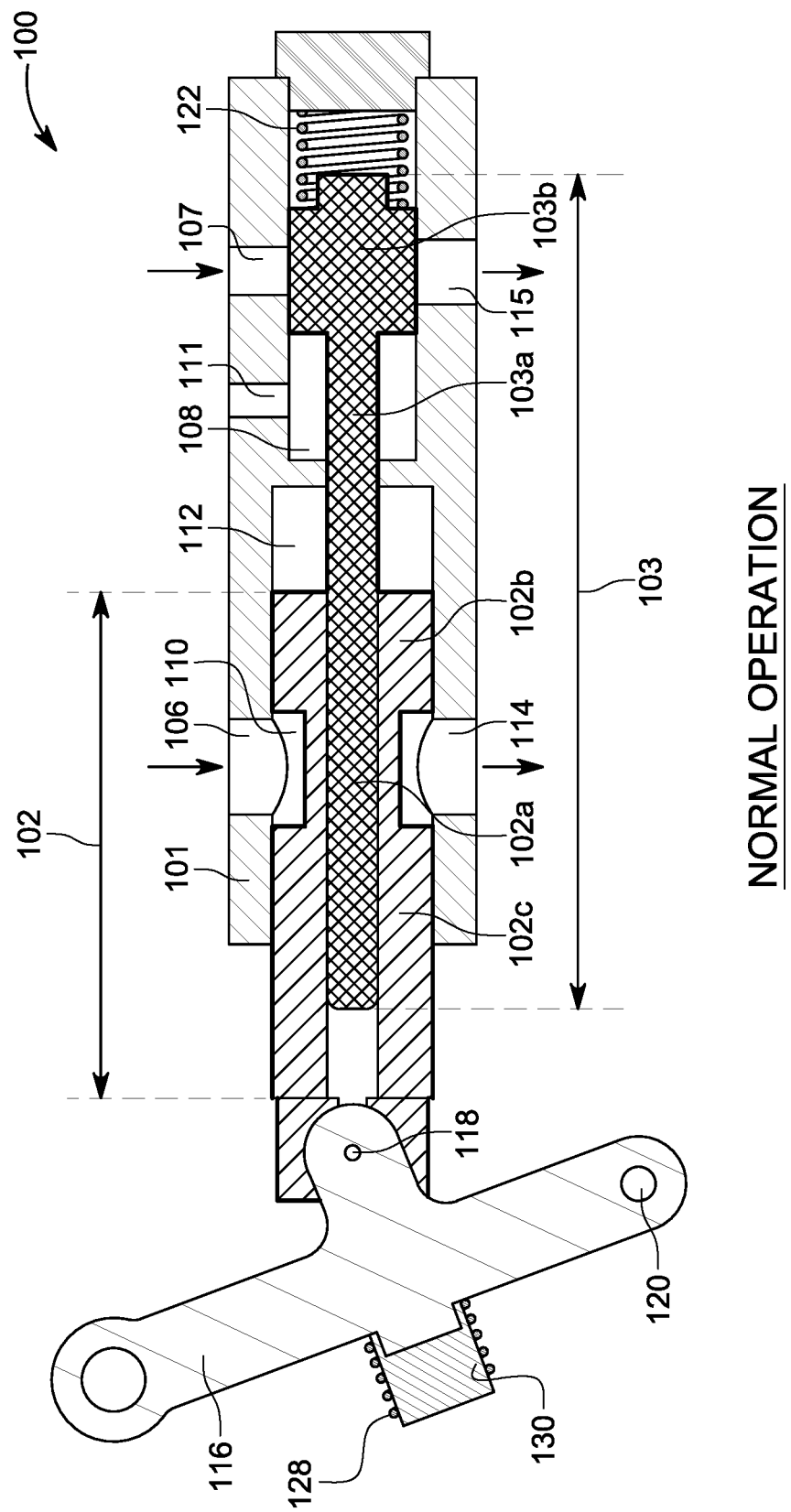
FIG. 1D illustrates a cross-sectional view of the in-line embodiment of the interlocked single-function activation valve described herein during normal operation.

FIG. 1D illustrates a cross-sectional view of the in-line embodiment of the interlocked single-function activation valve described herein during normal operation.

As can be seen in FIG. 1D, when the operation lever 116 is engaged, interlock spool 103 is not mechanically held in the retracted position by operation lever 116. Rather, the system pressure of the hydraulic fluid in safety cavity 108 holds interlock spool 103 in the retracted position.

Figure 1E:
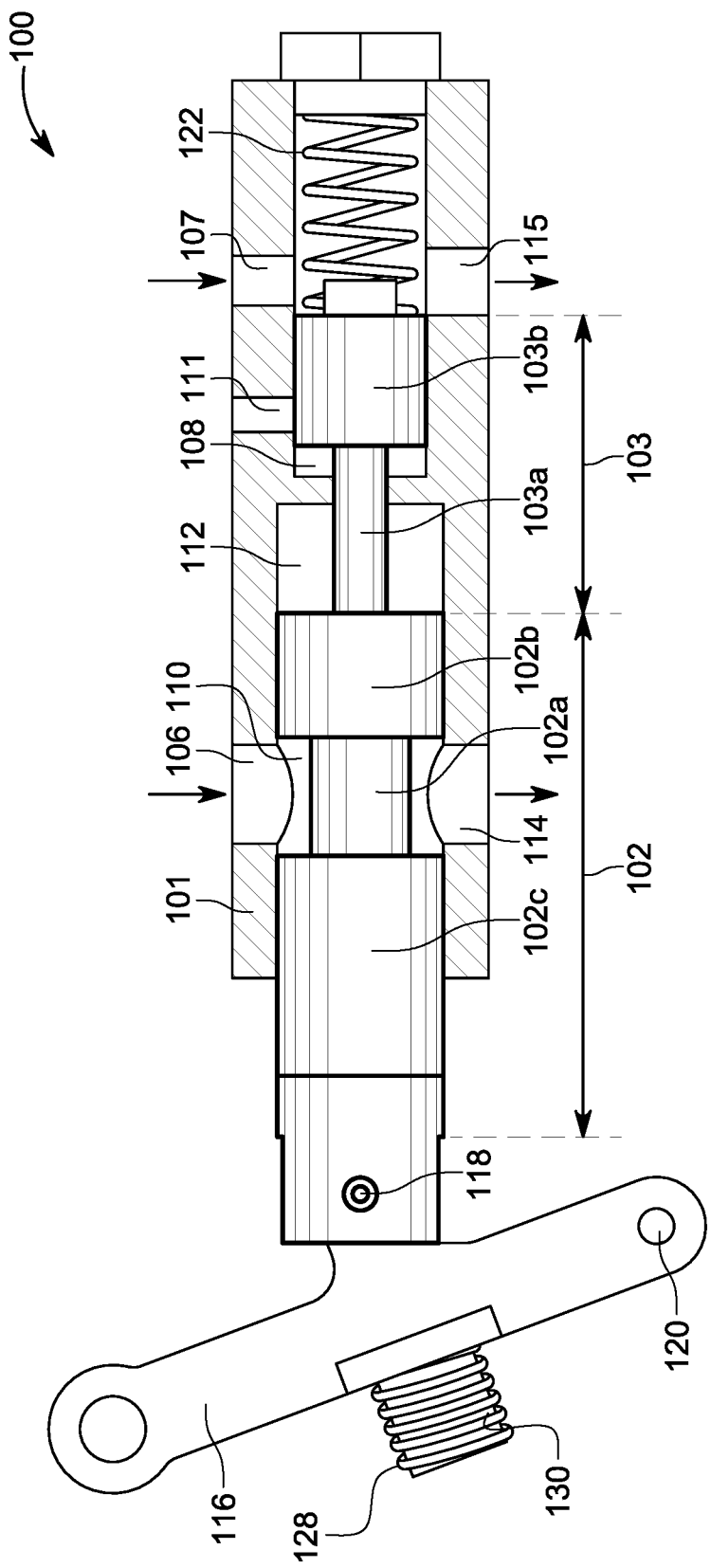
FIG. 1E illustrates a perspective view of the in-line embodiment of the interlocked single-function activation valve described herein during a safety override scenario.

FIG. 1E illustrates a perspective view of the in-line embodiment of the interlocked single-function activation valve described herein during a safety override scenario. In a safety override situation, a user may have tied down the operation lever 116 in the engaged position such that a safety device need not be engaged each time the user wants to operate the system. In such a scenario, the system may be powered down or turned off, which means the overall system is de-pressurized, while the operation lever 116 remains engaged because it has been improperly tied down (i.e., in the open position). Thus, operation lever 116 remains engaged as a result of the tie-down. When the system is shut down, however, the safety cavity 108 becomes de-pressurized, which allows the force of the biasing member 122 to push the interlock spool 103 into the extended position. When interlock spool 103 moves into the extended position, the interlock land 103b no longer blocks flow from the system pressure port 107 to the tank port 115. Because the hydraulic fluid in the system has a path to tank (e.g., via system pressure port 107 and tank port 115), the system cannot fully pressurize sufficient to provide the necessary working pressure for the system at working outlet port 114. Thus, the system will not operate until the assembly 100 or the operation lever 116 is reset by removing the tie-down or override situation. When the assembly 100 or the operation lever 116 is reset, the interlock spool 103 is likewise reset as a result of the mechanical engagement between the operation lever 116 and the interlock spool 103.

In other words, in a safety override or tie-down scenario, valve assembly 100 remains engaged because the tied-down operation lever 116 keeps operational spool 102 open to allow hydraulic fluid to flow. However, when the system is turned off, the hydraulic fluid is de-pressurized, which allows the force from the biasing member 122 to overcome the force of the hydraulic fluid to push the interlock spool 103 into an extended position, as shown in FIG. 1E. When the interlock spool 103 is in the extended position, interlock land 103b is in position to block the flow of hydraulic fluid into safety cavity 108 from pilot port 111 and instead creates a path to tank, which means the system will lose working pressure when it is re-pressurized.

Because the system is de-pressurized by the interlock spool 103, the valve assembly 100 cannot be reactivated until it has been reset. Thus, if a user has tried to override the safety mechanism by tying it down, they can only use the valve one time, for the current time when they tied the system down. Any subsequent uses of the system with the tie-down or safety override are prevented until the system is reset. To reset the system, the tie-down must be removed, which causes the operation lever 116 to mechanically push the interlock spool 103 back into the retracted position. When the system is re-pressurized, the interlock spool 103 is held in the retracted position, as shown in FIG. 1A.

Figure 1F:
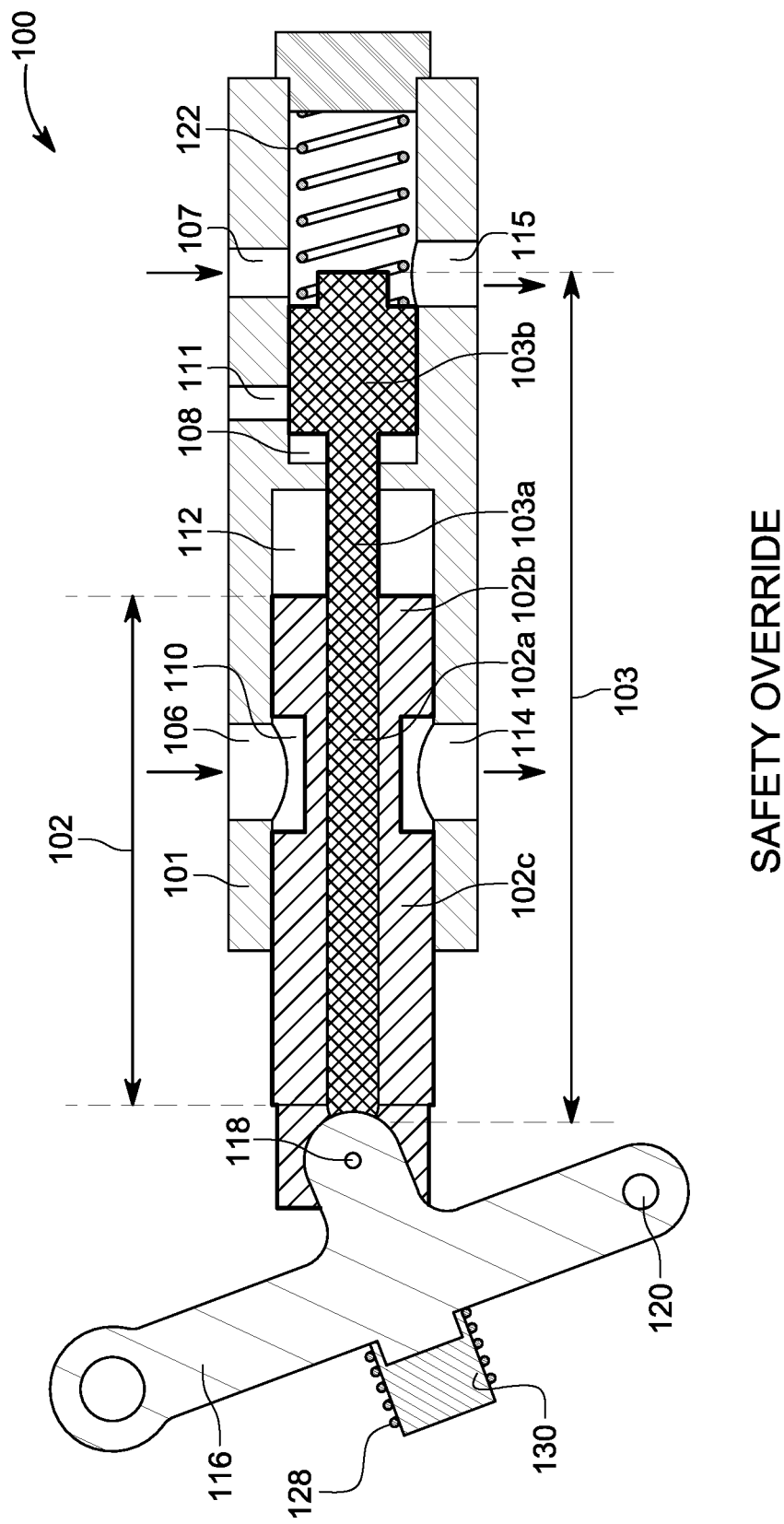
FIG. 1F illustrates a cross-sectional view of the in-line embodiment of the interlocked single-function activation valve described herein during a safety override scenario.

FIG. 1F illustrates a cross-sectional view of the in-line embodiment of the interlocked single-function activation valve described herein during a safety override scenario.

As shown in FIG. 1F, when the interlock spool 103 is in the extended position, the interlock shaft 103a mechanically engages operation lever 116.

The result of the safety valve described herein is that the valve can only be used one time before it must be reset. If a user tries to override the safety system by tying it down, the system will only work one time before it will need to be reset. This helps prevent dangerous tie-down or override situations.

Figure 2A:
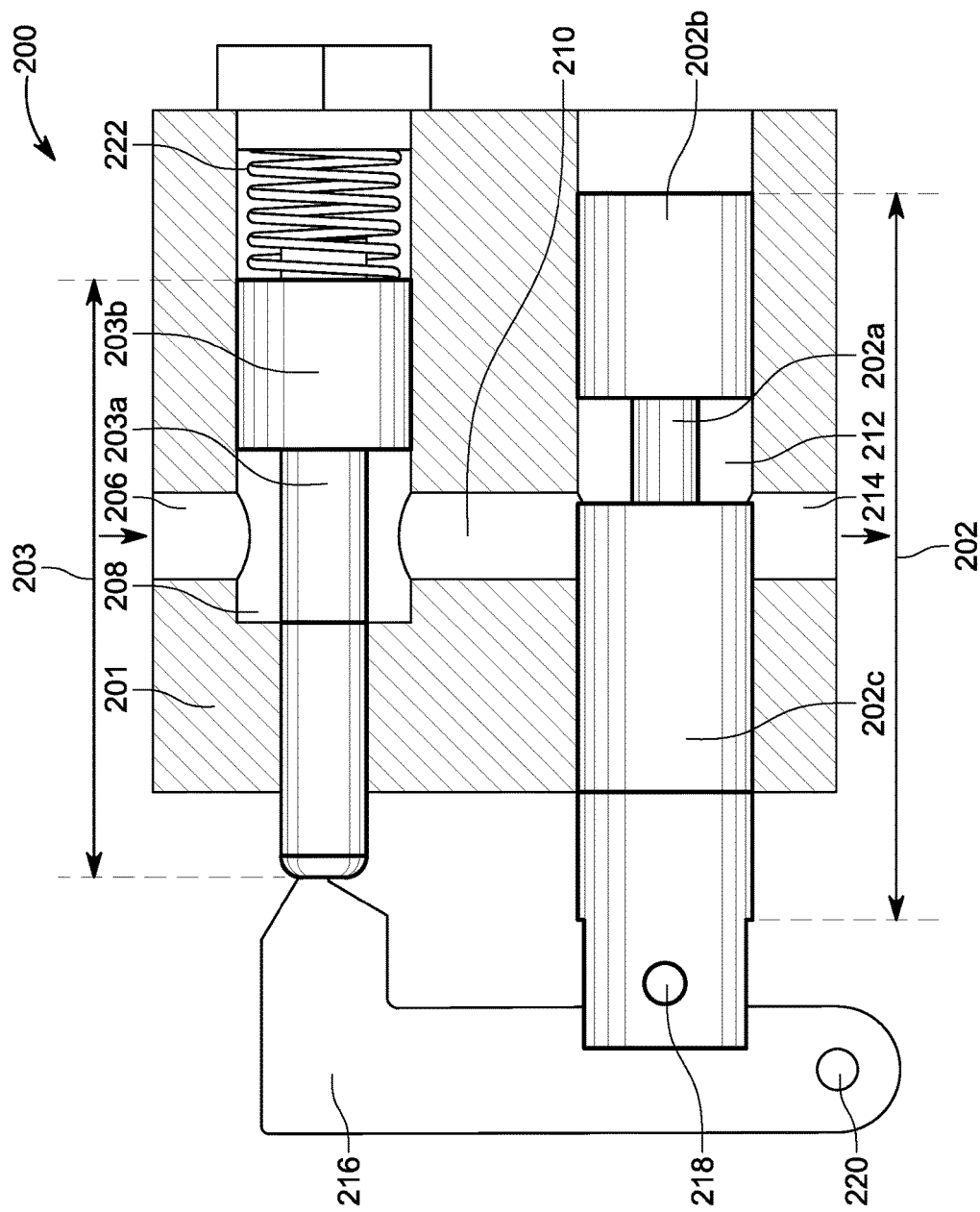
FIG. 2A illustrates a perspective view of a stacked embodiment of the interlocked single-function activation valve described herein in the start-up position.
Figure 2B:
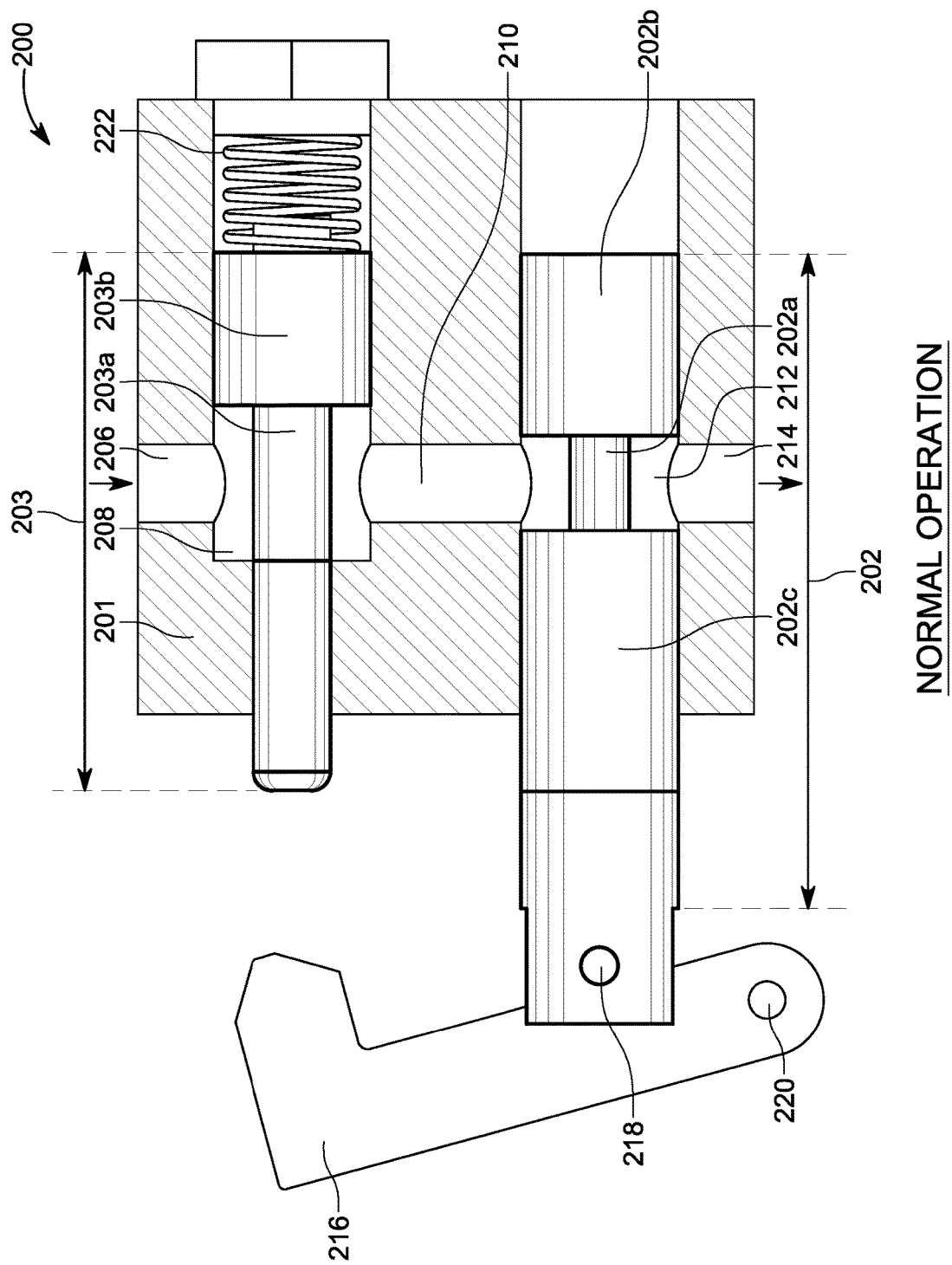
FIG. 2B illustrates a perspective view of the stacked embodiment of the interlocked single-function activation valve described herein during normal operation.
Figure 2C:
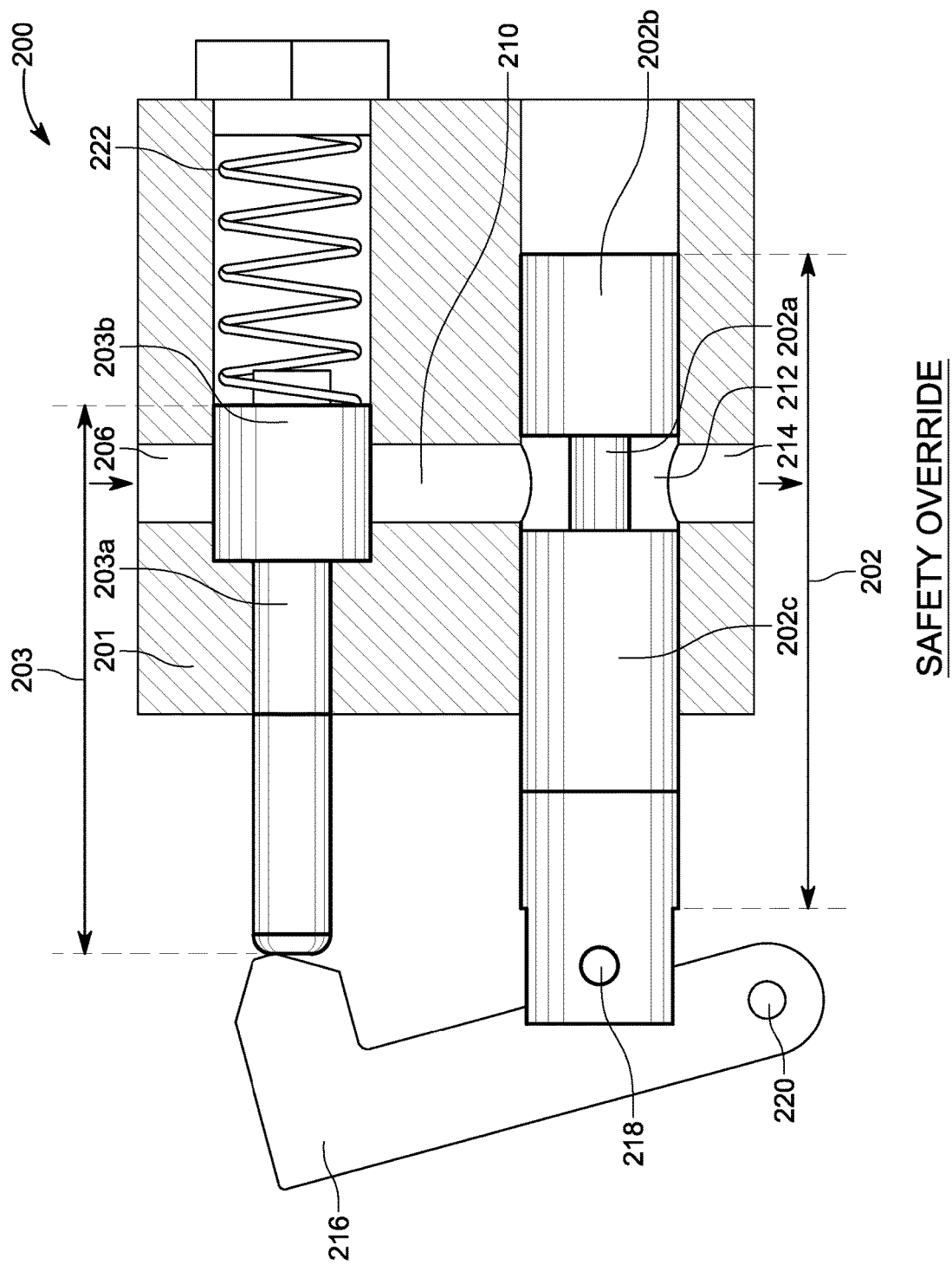
FIG. 2C illustrates a perspective view of the stacked embodiment of the interlocked single-function activation valve described herein during a safety override scenario.

FIGS. 2A-2C show a stacked embodiment of the in-line interlocked single-function activation valve described in FIGS. 1A-1F. Assembly 200 includes a valve body 201. Valve body 201 includes an internal operational cavity 212 and an internal safety cavity 208. In the embodiment shown in FIGS. 2A-2C, the operational cavity 212 and the safety cavity 208 are arranged in a stacked configuration. In a preferred embodiment, operational cavity 212 and safety cavity 208 are cylindrical.

Assembly 200 includes working inlet port 206 and working outlet port 214 defined through valve body 201 for flow therethrough of hydraulic fluid. Each of inlet port 206 and outlet port 214 is in fluid communication with operational cavity 212 and safety cavity 208. The hydraulic fluid generally flows, for example, as indicated by the flow arrows on FIGS. 2A-2C.

Assembly 200 includes operational spool 202 and interlock spool 203. In the embodiment shown in FIGS. 2A-2C, the interlock spool 203 comprises an interlock shaft 203a and an interlock land 203b, and the operational spool 202 comprises an operational spool groove 202a, an inner operational land 202b, and an outer operational land 202c.

Assembly 200 includes an operation lever 216. Operational spool 202 is mechanically coupled to operation lever 216 via spool pivot pin 218. Interlock spool 203 may be in contact with operation lever, depending on the status of the assembly 200, as explained in more detail below. Pivot 220 allows for rotational engagement of operation lever 216. Pivot 220 is fixed relative to the valve body 201, which allows for operation lever 216 to move relative to the valve body.

FIG. 2A illustrates a perspective view of a stacked embodiment of the interlocked single-function activation valve described herein in the start-up position. FIG. 2A shows the assembly 200 in the start-up position. When in the start-up position, interlock spool 203 (which comprises interlock shaft 203a and interlock land 203b) is mechanically held in the retracted position by operation lever 216, as shown in FIG. 2A. When interlock spool 203 is in the retracted position, biasing member 222 is compressed and applies an opposite force toward operation lever 216.

Hydraulic fluid flows into the assembly 200 via working inlet port 206. The hydraulic fluid may be supplied by a hydraulic fluid pump (not shown in FIG. 2A). The hydraulic fluid is pressurized at the system pressure. Because the interlock spool 203 is in the retracted position, the hydraulic fluid passes through the safety cavity 208 and into passage 210. Thus, safety cavity 208 and passage 210 are pressurized. The hydraulic fluid is blocked from entering operational cavity 212 by outer operational land 202c of operational spool 202. Accordingly, working outlet port 214 is not pressurized when the assembly 200 is in the start-up position. However, because the hydraulic fluid is pressurized in safety cavity 208, the interlock spool 203 is held in the retracted position by the pressure of the hydraulic fluid in a retracted position. The force of the hydraulic fluid is greater than the force of biasing member 222, thereby overcoming said force.

FIG. 2B illustrates a perspective view of the stacked embodiment of the interlocked single-function activation valve described herein during normal operation. During normal operation, operation lever 216 is engaged by the user. As explained, the operation lever 216 may be part of a safety system for the hydraulic system, whereby the operation lever 216 must be engaged by the user of the hydraulic system before the hydraulic system can be used. Thus, during normal operation, a user must engage operation lever 216, for example, by clipping in a safety lanyard or by inserting a key card outside the assembly 200 such that operation lever 216 is separated from interlock spool 203. During normal operation, safety cavity 208 is pressurized with hydraulic fluid, so safety interlock 203 is held by the pressure of the fluid in the retracted position, even when operation lever 216 is engaged.

When operation lever 216 is engaged, spool pivot pin 218 causes operational spool 202 to move axially such that the operational spool groove 202a in operational spool 202 allows the hydraulic fluid to flow through operational cavity 212 and out working outlet port 214. The hydraulic fluid flowing out of working outlet port 214 is used to operate the system to which the assembly 200 is connected.

FIG. 2C illustrates a perspective view of the stacked embodiment of the interlocked single-function activation valve described herein during a safety override scenario.

In a safety override situation, a user may have tied down the operation lever 216 in the engaged position such that a safety lanyard need not be clipped in each time the user wants to operate the system. In such a scenario, the system may be powered down or turned off, which means the overall system is de-pressurized, while the operation lever 216 remains engaged as a result of the tie-down. As a result, the valve assembly 200 remains active or engaged because the tied-down operation lever 216 keeps operational spool 202 open to allow hydraulic fluid to flow. When the system is shut down, however, the hydraulic fluid is de-pressurized, which allows the force from the biasing member 222 to overcome the force of the hydraulic fluid to push the interlock spool 203 into an extended position, as shown in FIG. 2C. When the interlock spool 203 is in the extended position, interlock land 203b of interlock spool 203 is in position to block the flow of hydraulic fluid into safety cavity 208 from working inlet port 206.

Because the flow of hydraulic fluid is blocked by the interlock land 203b, the valve 200 cannot be reactivated until it has been reset. This means that if a user has tried to override the safety mechanism by tying it down, they can only use the valve one time. To reset the system, the tie-down must be removed, which will cause the operation lever 216 to mechanically push the interlock spool 203 back into the retracted position. When the system is re-pressurized, the interlock spool 203 is held in the retracted position, as shown in FIG. 2A.

Figure 3B:
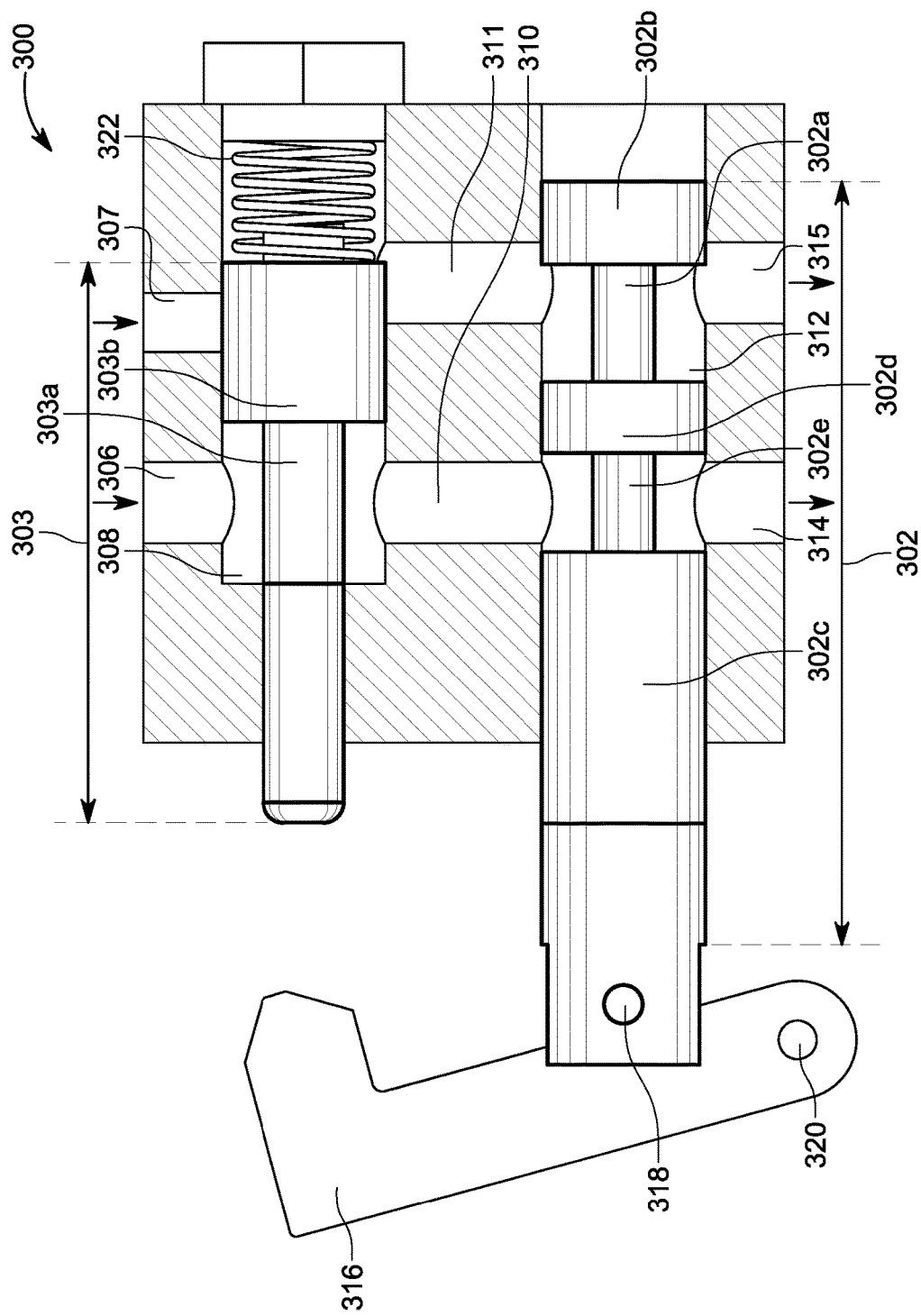
FIG. 3B illustrates a perspective view of the dump-to-tank embodiment of the interlocked single-function activation valve described herein during normal operation.
Figure 3C:
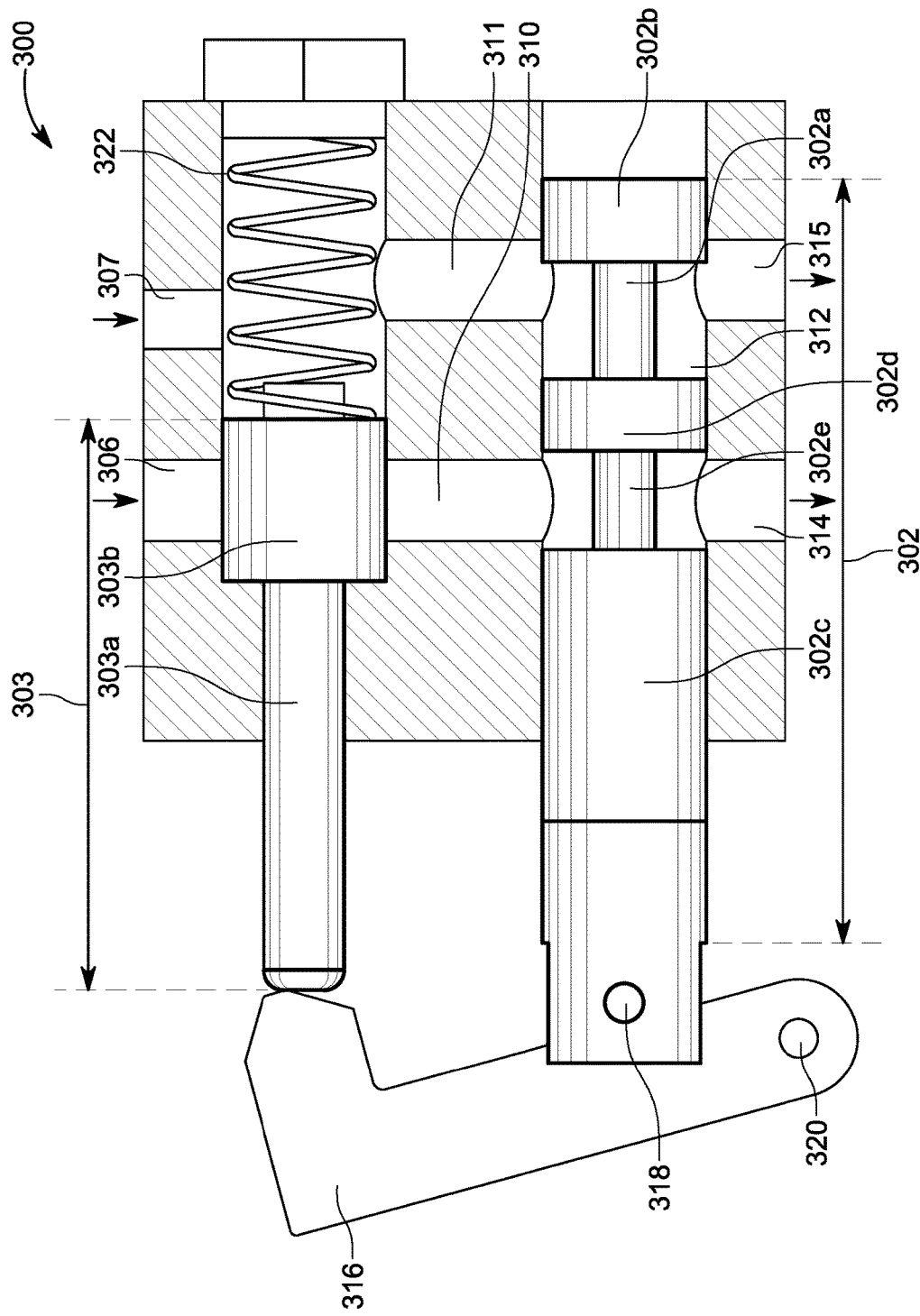
FIG. 3C illustrates a perspective view of the dump-to-tank embodiment of the interlocked single-function activation valve described herein during a safety override scenario.

FIGS. 3A-3C show a dump-to-tank embodiment of the stacked interlocked single-function activation valve described in FIGS. 2A-2C. The overall stacked structure of the operational spool and the interlock spool is similar to the structure shown and described in the context of FIGS. 2A-2C and uses similar reference numerals (beginning with "3" instead of "2") where appropriate. One difference between the embodiment shown in FIGS. 2A-2C and the embodiment shown in FIGS. 3A-3C is that the valve 300 further includes a dump-to-tank path for when the safety has been overridden or tied down. In the embodiment shown in FIGS. 3A-3C, the assembly 300 further includes system pressure port 307, tank passage 311, and tank port 315. The hydraulic fluid generally flows, for example, as indicated by the flow arrows on FIGS. 3A-3C. The interlock spool 303 comprises an interlock shaft 303a and an interlock land 303b, and the operational spool 302 comprises an inner operational land 302b, an outer operational land 302c, and a middle operational land 302d. The operational lands are connected by operational spool grooves 302a and 302e.

FIG. 3A illustrates a perspective view of a dump-to-tank embodiment of the interlocked single-function activation valve described herein in the start-up position.

FIG. 3A shows the assembly 300 in the start-up position. When in the start-up position, interlock spool 303 (which comprises interlock shaft 303a and interlock land 303b) is mechanically held in the retracted position by operation lever 316, as shown in FIG. 3A. When interlock spool 303 is in the retracted position, biasing member 322 is compressed and applies an opposite force toward operation lever 316.

Hydraulic fluid flows into the assembly 300 via working inlet port 306. The hydraulic fluid may be supplied by a hydraulic fluid pump (not shown in FIG. 3A). The hydraulic fluid is pressurized at the system pressure. Because the interlock spool 303 is in the retracted position, the hydraulic fluid passes through the safety cavity 308 and into working passage 310. Thus, safety cavity 308 and working passage 310 are pressurized. The hydraulic fluid is blocked from entering operational cavity 312 by outer operational land 302c of operational spool 302. Accordingly, working outlet port 314 is not pressurized when the assembly 300 is in the start-up position. However, because the hydraulic fluid is pressurized in safety cavity 308, the interlock spool 303 is held in the retracted position by the pressure of the hydraulic fluid against the interlock land 303b in safety cavity 308. The force of the hydraulic fluid is greater than the force of biasing member 322, thereby overcoming said force.

When the interlock spool 303 is in the retracted position, hydraulic fluid flowing into system pressure port 307 is blocked by interlock land 303b. Because system pressure port 307 is blocked, tank passage 311 is not pressurized.

FIG. 3B illustrates a perspective view of the dump-to-tank embodiment of the interlocked single-function activation valve described herein during normal operation.

As shown in FIG. 3B, during normal operation, operation lever 316 is engaged. The operation lever 316 may be engaged by a user to operate the system. As explained, the operation lever 316 may include or be part of a safety system for the hydraulic system, whereby the operation lever 316 must be engaged by the user of the hydraulic system before the hydraulic system can be used. Thus, during normal operation, a user must engage operation lever 316, for example, by engaging a safety device (e.g., by clipping in a safety lanyard or by inserting a key card outside the assembly 300) such that operation lever 316 is separated from interlock spool 303. During normal operation, safety cavity 308 is pressurized with the hydraulic fluid, so interlock spool 303 remains in the retracted position, even when operation lever 316 is engaged.

When operation lever 316 is engaged, spool pivot pin 318 causes operational spool 302 to move axially such that the operational spool groove 302e in operational spool 302 allows the hydraulic fluid to flow through operational cavity 312 and out working outlet port 314. The hydraulic fluid flowing out of working outlet port 314 is used to operate the system to which the assembly 300 is connected.

FIG. 3C illustrates a perspective view of the dump-to-tank embodiment of the interlocked single-function activation valve described herein during a safety override scenario.

In a safety override situation, a user may have tied down the operation lever 316 in the engaged position such that a safety lanyard need not be clipped in each time the user wants to operate the system. In such a scenario, the system may be powered down or turned off, which means the overall system is de-pressurized, while the operation lever 316 remains engaged as a result of the tie-down. As a result, the valve assembly 300 remains active or engaged because the tied-down operation lever 316 keeps operational spool 302 open to allow hydraulic fluid to flow. When the system is shut down, however, the hydraulic fluid is de-pressurized, which allows the force from the biasing member 322 to overcome the force of the hydraulic fluid to push the interlock spool 303 into an extended position, as shown in FIG. 3C. When the interlock spool 303 is in the extended position, interlock land 303b of interlock spool 303 is in position to block the flow of hydraulic fluid into safety cavity 308 from working inlet port 306.

Because the flow of hydraulic fluid is blocked by the interlock land 303b, the valve 300 cannot be reactivated until it has been reset. This means that if a user has tried to override the safety mechanism by tying it down, they can only use the valve one time. To reset the system, the tie-down will have to be removed, which will cause the operation lever 316 to push the interlock spool 303 back into the retracted position. When the system is re-pressurized, the interlock spool 303 is held in the retracted position, as shown in FIG. 3A.

Furthermore, as shown in FIG. 3C, when operation lever 316 is engaged and the system is in a tie-down situation, the system is de-pressurized and the interlock spool 303 moves into the extended position. When the interlock spool 303 is in the extended position, hydraulic fluid flowing into system pressure port 307 is no longer blocked by interlock land 303b. Because system pressure port 307 is not blocked, tank passage 311 provides a path through tank port 315 to the tank. And because the hydraulic fluid in the system has a path to the tank (e.g., via system pressure port 307 and tank port 315), the system cannot fully pressurize sufficient to provide the necessary working pressure for the system at working outlet port 314. Thus, the system will not operate until the assembly 300 or the operation lever 316 is reset by removing the tie-down or override situation. When the assembly 300 or the operation lever 316 is reset, the interlock spool 303 is likewise reset as a result of mechanical engagement between the operation lever 316 and the interlock spool 303.

It should be noted that, although the present invention is described with reference to hydraulic cylinders, the cylinders could be air driven or could be any other suitable form of power actuators.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a," "an," and "the" refer to "one or more" when used in the subject specification, including the claims. Thus, for example, reference to "a device" can include a plurality of such devices, and so forth.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A hydraulic valve assembly for preventing safety override, the hydraulic valve assembly comprising:
    a valve body having a first cylindrical internal cavity and a second cylindrical internal cavity, the cylindrical internal cavities arranged in an in-line configuration along a radial axis;

a first axially moveable cylindrical spool supported within the first cylindrical cavity, wherein the first spool is attached at one end to a valve control member;

a second axially moveable cylindrical spool supported within the second cylindrical cavity, wherein the second spool contacts the first spool at one end, wherein the second spool is an interlock spool having a radially oriented interlock land provided thereon that is coaxial with the interlock spool, and wherein the interlock land engages a biasing member providing force in the axial direction toward the control member;

hydraulic ports defined through the valve body for flow therethrough of hydraulic fluid, wherein the hydraulic ports include an inlet port that allows the hydraulic fluid to flow into the hydraulic valve assembly and an outlet port that allows the hydraulic fluid to flow out of the hydraulic valve assembly, wherein the hydraulic ports further include a system pressure inlet port and a tank outlet port, and wherein, when the control member is engaged, the interlock spool allows flow of the hydraulic fluid from the system pressure port to the tank port, and the flow of the hydraulic fluid from the system pressure port to the tank port prevents the hydraulic system from achieving a working pressure;

wherein the interlock spool is axially movable between a retention position and an extension position such that when the interlock spool is in the extension position, the interlock land prevents flow of the hydraulic fluid out of the outlet port at a working pressure.

2. The hydraulic valve assembly of claim 1, wherein the interlock spool moves into the extension position in response to the force provided by the biasing member when the hydraulic system is de-pressurized while the control member is engaged.

3. The hydraulic valve assembly of claim 1, wherein, when the hydraulic system is re-pressurized after being de-pressurized, a dump-to-tank path allows the hydraulic fluid to flow to a tank.

4. The hydraulic valve assembly of claim 1, wherein the hydraulic system is pressurized by a fluid pump that is in fluid communication with the hydraulic valve assembly.

5. The hydraulic valve assembly of claim 1, wherein the hydraulic system is pressurized in response a user powering on the hydraulic system.

6. The hydraulic valve assembly of claim 1, wherein safety override occurs when a user of the hydraulic valve assembly configures the control member to remain in an engaged position when the hydraulic system is turned off.

7. The hydraulic valve assembly of claim 1, wherein the control member is engaged by engaging a safety device with the control member, wherein the safety device is part of a fall-arrest system.

8. The hydraulic valve assembly of claim 1, wherein the control member is engaged by pulling it away from the hydraulic valve assembly.

9. The hydraulic valve assembly of claim 1, wherein the interlock spool is in the extension position when the force exerted on the interlock land by the biasing member is greater than a force exerted in the opposite direction by pressure of the hydraulic fluid.

10. The hydraulic valve assembly of claim 1, wherein the tie-down configuration is a safety override configuration intended to allow a user of the control member to operate the hydraulic valve assembly without using a safety mechanism.

* * * * *